(12) United States Patent
Stehle et al.

(10) Patent No.: US 8,272,752 B2
(45) Date of Patent: Sep. 25, 2012

(54) PANORAMIC PROJECTION DEVICE, AND METHOD IMPLEMENTED BY THIS DEVICE

(75) Inventors: Robert Andre Marcel Stehle, Bonneval (FR); Michael Bray, Wissous (FR); Laurent Sarry, Romagnat (FR); Eric Zeghers, Le Pertuis (FR)

(73) Assignees: Universite Clermont 1, Clermont-Ferrand (FR); Robert Andre Marcel Stehle, Bonneval (FR); MB Optique, Wissous (FR); Michael Bray, Wissous (FR)

( * ) Notice: Subject to any disclaimer, the term of this patent is extended or adjusted under 35 U.S.C. 154(b) by 270 days.

(21) Appl. No.: 12/672,767

(22) PCT Filed: Aug. 8, 2008

(86) PCT No.: PCT/FR2008/051485
§ 371 (c)(1),
(2), (4) Date: Feb. 9, 2010

(87) PCT Pub. No.: WO2009/022087
PCT Pub. Date: Feb. 19, 2009

(65) Prior Publication Data
US 2011/0211175 A1    Sep. 1, 2011

(30) Foreign Application Priority Data
Aug. 9, 2007 (FR) ..................... 07 05784

(51) Int. Cl.
G03B 21/00    (2006.01)
G03B 21/28    (2006.01)

(52) U.S. Cl. ........................ 353/121; 353/122

(58) Field of Classification Search ............ 353/30, 353/37, 69, 70, 79, 82, 89, 94, 119, 121, 353/122
See application file for complete search history.

(56) References Cited

U.S. PATENT DOCUMENTS

| | | | | |
|---|---|---|---|---|
| 2,299,682 A | * | 10/1942 | Conant | 396/351 |
| 3,539,249 A | * | 11/1970 | Jaulmes | 252/69 |
| 3,692,934 A | * | 9/1972 | Herndon | 348/36 |
| 3,740,469 A | * | 6/1973 | Herndon | 348/36 |

(Continued)

FOREIGN PATENT DOCUMENTS

GB    2298497    9/1996

OTHER PUBLICATIONS

French search report.

(Continued)

*Primary Examiner* — Francis M Legasse, Jr.
*Assistant Examiner* — Bao-Luan Le
(74) *Attorney, Agent, or Firm* — Young & Thompson

(57) ABSTRACT

A projection device (1) includes: a projector (2) adapted for projecting a mother image along a projection axis (11); and a convex mirror adapted for at least partially reflecting the mother image and projecting it onto a three-dimensional environment (7, 8a, 8b) such as the ground, a ceiling, one or more side walls and the content of a room. When combining the projector with a convex mirror, the mother image can for example be projected into a solid angle higher than $2\pi$ steradians (i.e. a half-sphere), or even substantially equal to or slightly lower than $4\pi$ steradians (i.e. a sphere). A method implemented by the device is also described. The field of the invention is particularly that of video projectors for virtual or mixed reality applications.

15 Claims, 2 Drawing Sheets

U.S. PATENT DOCUMENTS

Figure 1:
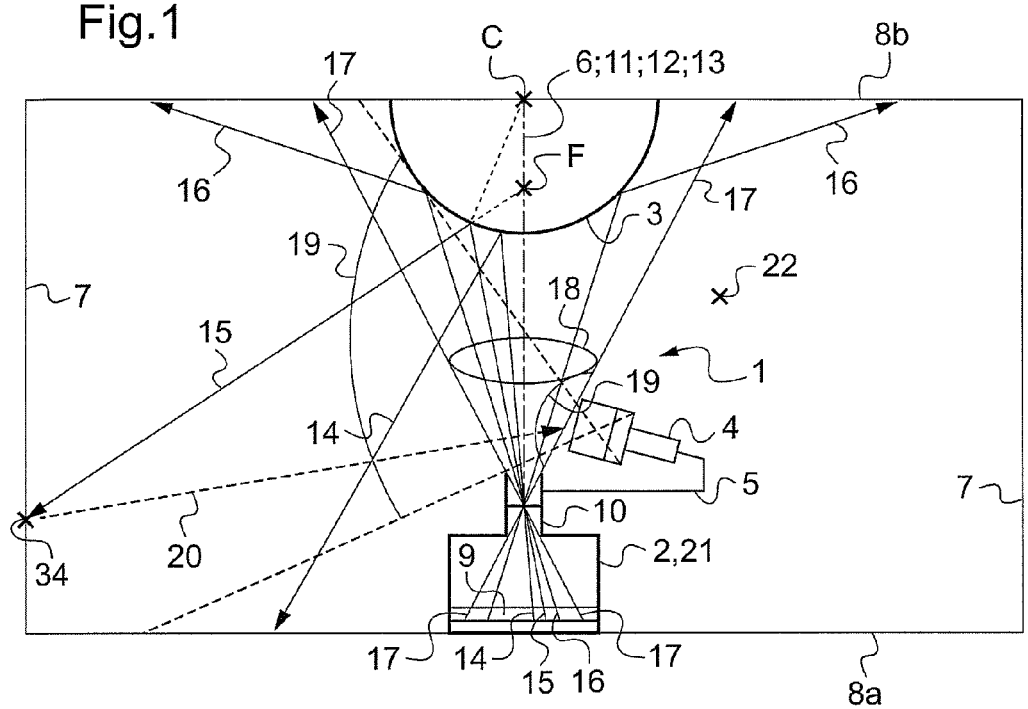

| | | | | |
|---|---|---|---|---|
| 4,464,029 | A * | 8/1984 | Jaulmes | 352/69 |
| 6,327,020 | B1 * | 12/2001 | Iwata | 352/69 |
| 6,409,351 | B1 * | 6/2002 | Ligon | 353/98 |
| 6,644,816 | B1 * | 11/2003 | Perra et al. | 353/119 |
| 6,834,965 | B2 * | 12/2004 | Raskar et al. | 353/94 |
| 7,118,228 | B2 * | 10/2006 | May | 353/99 |
| 7,229,176 | B2 * | 6/2007 | Onaga | 353/10 |
| 7,253,969 | B2 * | 8/2007 | Gal | 359/725 |
| 7,604,354 | B1 * | 10/2009 | Ligon | 353/30 |
| 2001/0040671 | A1 * | 11/2001 | Metcalf | 353/94 |
| 2002/0149752 | A1 * | 10/2002 | Courchesne | 353/122 |
| 2003/0007135 | A1 * | 1/2003 | Sciammarella et al. | 353/98 |
| 2003/0081952 | A1 | 5/2003 | Geng | |
| 2005/0094111 | A1 * | 5/2005 | May | 353/98 |
| 2007/0200926 | A1 * | 8/2007 | Chianglin | 348/36 |

OTHER PUBLICATIONS

International search reprot.

* cited by examiner

PANORAMIC PROJECTION DEVICE, AND METHOD IMPLEMENTED BY THIS DEVICE

TECHNICAL FIELD

The present invention relates to a device for projecting an image, for example onto the surfaces of a room. It also relates to a method implemented by this device.

The field of the invention is more particularly that of video projectors for virtual or mixed reality applications.

For a virtual reality application, the device according to the invention allows for example a user to project an image onto the surfaces of a room, so that the projected image creates a virtual reality environment; an observer observing the projected image having the illusion of observing a scene from a virtual viewpoint.

For a mixed reality application, the device according to the invention allows for example a user to project an image onto the surfaces of a room, so that the projected image creates a mixed reality environment in combination with real elements of the room.

STATE OF THE PRIOR ART

Examples of a device for the projection of a sequence of images onto a volume are known, this device comprising a single projector. The projector is arranged in order to project an image in a direction of projection, the projected image increasing in size as it is propagated along a solid angle of projection centred on the direction of projection. The volume within which the device can project the image is limited by the aperture of the projector, i.e. by the value of the solid angle of projection. Thus, such a device, the projector of which is placed at the centre of a rectangular room cannot project an image simultaneously onto the four side walls of the room.

Projection devices are also known comprising several projectors, each projector illuminating a facet or a particular object of the volume. These devices have the drawback of comprising several projectors, representing an added expense, and generally requiring the projections of the projectors to be coordinated.

The purpose of the present invention is to propose a device for projecting an image from a single projector, without the volume or the environment onto which the image can be projected being limited by an aperture of the projector.

DISCLOSURE OF THE INVENTION

This purpose is achieved with a projection device, comprising:
  a projector arranged in order to project a mother image along an axis of projection, and
  a convex mirror arranged in order to reflect the mother image at least partially and project it onto a three-dimensional environment.

The mirror is called convex as it comprises a convex surface arranged in order to reflect the mother image at least partially and project it onto the environment.

Preferably, the projector is arranged in order to project successively different mother images, such as for example successive mother images of a video stream. These different mother images can be of different sizes and different positions with respect to the axis of projection.

The mirror can be a convex mirror having substantially a revolution symmetry around an axis of revolution. In this case, the axis of revolution of the mirror and the axis of projection are preferably substantially merged.

In this document, it is said that two axes are substantially merged either when they are exactly merged, or when they are merged notwithstanding any imperfection.

Preferably, the mirror is arranged in order to reflect the mother image by deforming the mother image. For example, the projector can be arranged in order to project the mother image within a first solid angle, and the mirror can be arranged in order to project the mother image within a second solid angle larger than the first solid angle. Preferably, the first solid angle is smaller than $2\pi$ steradians, i.e. than a hemisphere.

In this document, it is said that the mother image is projected within a solid angle if the size of this mother image increases according to the solid angle progressively as it is propagated along a direction of projection.

The second solid angle can have any value whatever between 0 and $4\pi$ steradians, the value of the second solid angle depending in particular on the position of the mother image with respect to the axis of projection, the incidence of the axis of projection on the mirror, and the size of the mother image. For a given mother image, the second solid angle can be larger than $2\pi$ steradians (i.e. a hemisphere), or even substantially equal to or slightly smaller than $4\pi$ steradians (i.e. a sphere).

Similarly, the mirror can be arranged in order to project the mother image within an angle around the axis of projection, and the value of this angle can be comprised between 0 degrees and 360 degrees, and depending in particular on the position of the image with respect to the axis of projection, the incidence of the axis of projection on the mirror, and the size of the mother image. For a given mother image, the mirror can be arranged in order to project the mother image within an angle larger than 180 degrees around the axis of projection, or even substantially equal to 360 degrees around the axis of projection.

In this document, an angle around an axis is defined in a plane perpendicular to the axis.

The device according to the invention can comprise moreover means for acquiring at least one image of the three-dimensional environment. An image of the environment can image a part or the whole of the three-dimensional environment. The acquisition means can be arranged in order to acquire at least one image of the environment from light rays emitted by the environment and not reflected by the mirror. The acquisition means can comprise a camera, and means of rotating the camera about an axis of rotation. Preferably, the acquisition means are arranged in order to acquire several images of the environment, the sum of these images imaging the environment over 360 degrees around an axis such as the axis of rotation. Preferably, the axis of projection and the axis of rotation are substantially merged. Furthermore, the device according to the invention can comprise moreover means of modelling the three-dimensional environment from at least one image of the environment.

The device according to the invention can comprise moreover means of constructing the mother image according to a position of an observer and optionally of a modelling of the three-dimensional environment, so that the observer observing from his position a projection of the mother image onto the environment observes a scene from a given virtual viewpoint.

Furthermore, the device according to the invention can comprise moreover means for measuring at least one radiometric characteristic of the three-dimensional environment, and means of correcting the mother image according to at least one measured radiometric characteristic.

Finally, the device according to the invention can comprise moreover means for fixing the mirror to a wall, floor or ceiling.

According to another aspect of the invention, a projection method implemented by a device according to the invention is proposed, comprising:
- a projection of a mother image along an axis of projection,
- a reflection of at least one part of the mother image by a convex mirror, and
- a projection onto a three-dimensional environment of the mother image reflected by the convex mirror.

It is possible that a part of the mother image is not reflected by the mirror, this part of the mother image being directly projected onto the three-dimensional environment by the projector.

Preferably, the mirror reflects the mother image by deforming the mother image. For example, the projector can project the mother image within a first solid angle, and the mirror can project the mother image within a second solid angle larger than the first solid angle. Preferably, the first solid angle is smaller than $2\pi$ steradians, i.e. than a hemisphere.

The second solid angle can have any value whatever between 0 and $4\pi$ steradians, the value of the second solid angle depending in particular on the position of the image with respect to the axis of projection, the incidence of the axis of projection on the mirror, and the size of the mother image. For a given mother image, the second solid angle can be larger than $2\pi$ steradians (i.e. a hemisphere), or even substantially equal to or slightly smaller than $4\pi$ steradians (i.e. a sphere).

Similarly, the mirror can project the mother image within an angle around the axis of projection, and the value of this angle can be comprised between 0 degrees and 360 degrees. For a given mother image, the mirror can project the mother image within an angle larger than 180 degrees around the axis of projection, or even substantially equal to 360 degrees around the axis of projection.

The method according to the invention can comprise moreover acquiring at least one image of the three-dimensional environment.

The acquisition of an image can comprise:
- positioning a camera at an angular position around an axis of rotation, and
- acquiring an image of the environment for this angular position of the camera, from light rays emitted by the three-dimensional environment.

The method according to the invention can comprise moreover a modelling of the three-dimensional environment, the mother image comprising at least one modelling point, the acquisition of images comprising an acquisition of at least one image of the environment for the modelling, the modelling comprising for each modelling point and for each image of the environment acquired for the modelling:
- calculating the path of a light ray originating from the modelling point, reflected by the mirror, and projected onto a first point of the environment,
- calculating the path of a light ray originating from the first point of the environment and imaged by a point of the image of the environment acquired for the modelling, and
- calculating an intersection of the path of the light ray originating from the modelling point and of the path of the light ray originating from the first point of the environment.

The greater the number of modelling points, the higher the modelling resolution. The modelling points can be distributed over several successively projected mother images. Preferably, the images of the environment acquired for the modelling comprise several images of the environment, the sum of these images imaging the environment over 360 degrees around an axis such as the axis of rotation. It is thus possible to model the environment over 360 degrees around the axis.

The calculations of paths can depend on calculation parameters; the method according to the invention can comprise a calibration of the parameters, the mother image comprising at least one calibration point, and the acquisition of images comprising acquisition of at least one image of the environment for the calibration.

The images of the environment acquired for the calibration can comprise at least one pair of images which are different but which image a common part of the environment, the calibration comprising for each calibration point and for each pair of images:
- associating the calibration point with a point of the first image of the pair and with a point of the second image of the pair, the point of the first image of the pair and the point of the second image of the pair imaging a second point of the environment on which the calibration point is projected,
- calculating a theoretical position of the point of the second image of the pair, from the position of the point of the first image of the pair and the calculation parameters, and the calibration can further comprise a modification of at least one of the calculation parameters, so as to minimize the sum, over all the calibration points, of the distances between the position of the point of the second image of the pair and the theoretical position of this point of the second image of the pair.

The calibration can also comprise for each calibration point and for each image of the environment acquired for the calibration:
- calculating the path of a light ray originating from the calibration point, reflected by the mirror, and projected onto a third point of the environment,
- calculating the path of a light ray originating from the third point of the environment and imaged by a point of the image of the environment acquired for the calibration, and the calibration can further comprise a modifying at least one of the calculation parameters, so as to minimize the sum, over all the calibration points, of the distances between the path of the light ray projected onto the third point of the environment and the path of the light ray originating from the third point of the environment.

For each of the calibrations described above, the larger the number of calibration points, the better the calibration of the parameters. The calibration points can be distributed over several successively projected mother images. Preferably, the images of the environment acquired for the calibration comprise several images of the environment, the sum of these images imaging the environment over 360 degrees around an axis such as the axis of rotation.

Points of the mother image can be used both as a modelling point and as a calibration point. Thus, first points of the environment, second points of the environment, and third points of the environment can be merged. Similarly, images of the environment can be acquired at the same time for modelling and for calibration.

In this document, a "point" can have a surface different from zero. In fact, a "point" of the mother image (such as a modelling or calibration point) can typically consist of at least one pixel, preferably a single pixel. The size of a point of the environment and the size of a point of an image of the environment depend for example on optical characteristics of the projector or the camera (focal lengths, etc.), the distance between the projector and the point of the environment, etc.

Moreover, by "distance between two paths" is meant the length of the shortest direct route between the two paths.

The method according to the invention can comprise moreover a construction of the mother image according to a position of an observer and optionally of a modelling of the three-dimensional environment, so that the observer observing from his position the projection of the mother image onto the environment observes a scene from a given virtual viewpoint.

Finally, the method according to the invention can comprise moreover a measurement of at least one radiometric characteristic of the three-dimensional environment, and a correction of the mother image according to the at least one measured radiometric characteristic.

DESCRIPTION OF FIGURES AND EMBODIMENTS

Figure 2:
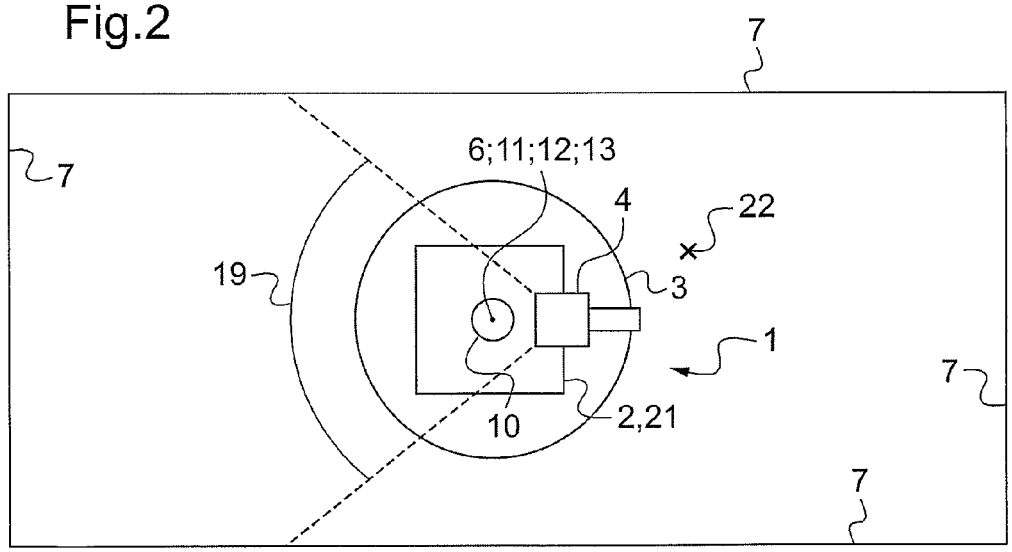
Figure 3:
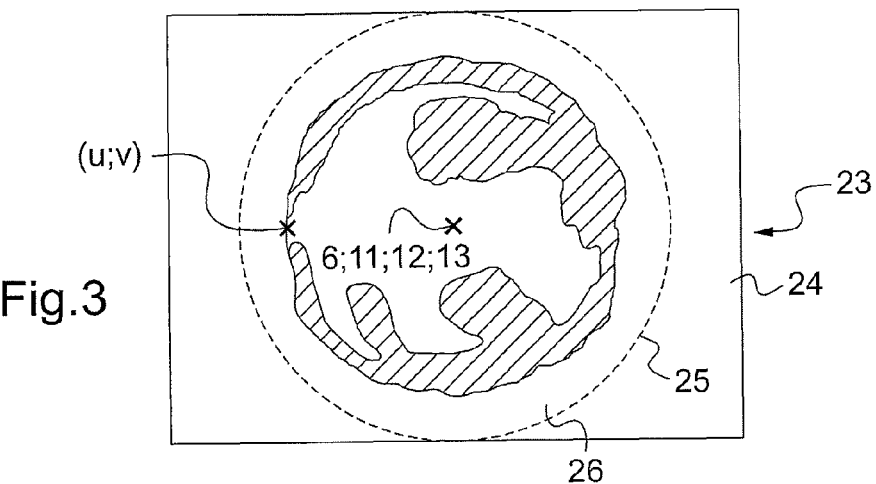
Figure 4:
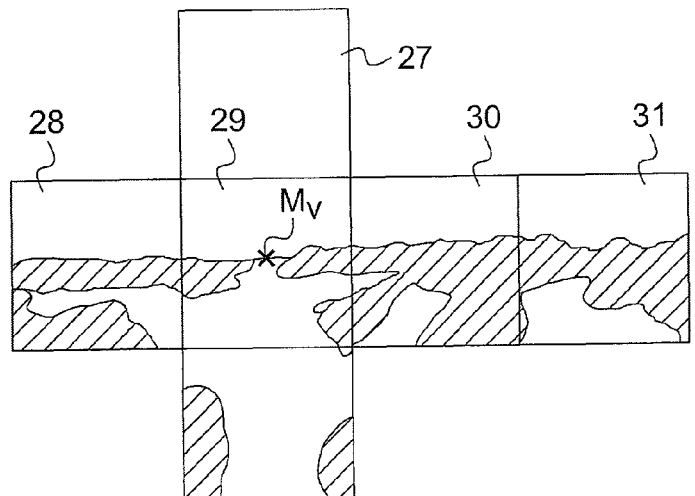
Figure 5:
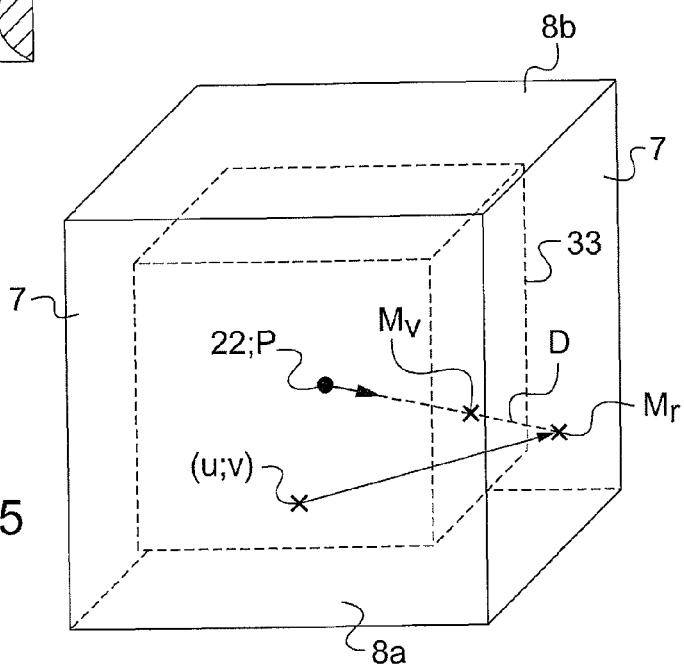

Other advantages and features of the invention will become apparent from reading the detailed description of implementations and embodiments which are in no way limitative, and from the following attached drawings:

FIG. 1 is a profile view of an embodiment of the device according to the invention, FIG. 2 is a top view of this device, FIG. 3 shows a mother image before its projection by this device, as displayed on the matrix of the projector of the device, FIG. 4 shows six perspectives of a scene, and FIG. 5 shows the construction of the mother image of FIG. 3, from the perspectives of FIG. 4.

An embodiment of device 1 according to the invention implementing a method according to the invention will therefore be described with reference to FIGS. 1 to 5.

The device 1 comprises a projector 2, a convex mirror 3, a camera 4, and means of rotating 5 the camera 4 about an axis of rotation 6. The device 1 is surrounded by a three-dimensional environment comprising different elements serving as a projection screen, in particular side walls 7, a floor 8a, a ceiling 8b of a room, as well as objects included in the room. It is possible for each of these elements not to be flat, such as for example a curved object, or a ceiling of a cellar.

The device 1 operates as follows. Initially, a scene is made available that it is desired to project onto the three-dimensional environment with a desired visual impression for an observer. The device 1 can cover practically all of the space of the environment by using on the one hand, the video projector 2 which projects a mother image in a beam which is angularly limited, and on the other hand, the retake mirror 3 placed overhead which reflects the angularly-limited beam in order to direct it towards the three-dimensional environment within a solid angle preferably as large as possible.

In order for the projection to be faithful to the desired visual impression, the device 1 takes account of the specificities of the projection screens: position, colour, reflection coefficients, interaction between them.

To this end, it exploits images captured by the acquisition camera 4 which records the environment illuminated by different coloured backgrounds or geometric primitives emitted by an array of the video projector. If the camera rotates about the optical axis of emission of the projector, then it can provide information on all the objects which serve as a projection screen, with parallax effects, and without a shadow area.

The information collected by the camera is processed and introduced in terms of a corrective of the mother image in order to modify it and generate a corrected mother image which itself will carry the modifications necessary for a faithful reconstruction of the scene on the screens, so that the observer has an impression of observing this scene with the desired visual impression.

The projector 2 is a matrix video projector, comprising a matrix 9 of pixels on which the mother image is displayed, and comprising moreover a lens 10. The projector is arranged in order to project the mother image via the lens 10 along an axis of projection 11 orthogonal with the wave front of the projected image, the size of the mother image increasing progressively as it is propagated along the axis of projection 11 according to a first solid angle of projection 18 centred on the axis of projection 11 and smaller than $2\pi$ steradians. Typically, the projector projects the mother image within a projection cone having an angle at the vertex of 30 degrees, i.e. within a first solid angle 18 of $\pi/4$ steradians. The optical axis 13 of the lens 10 passes substantially through the centre of the matrix 9, and is substantially merged with the axis of projection 11.

The mirror 2 is fixed to the ceiling 8b, the convex surface of the mirror 3 is oriented towards the projector 2, and the lens 10 is oriented towards the mirror 3, so that the convex surface of the mirror 3 is arranged to reflect at least in part the mother image projected within the first solid angle by the projector, and in order to project over all or part of the three-dimensional environment and within a second solid angle the part of the mother image reflected. Thus, the device 1 is a catadioptric projection device, as it combines the matrix video projector 2 with the convex mirror 3 intended to reflect the mother image in the three-dimensional environment 7, 8a, 8b.

In the example shown in FIG. 1, the projection of the mother image comprises a projection of several light rays 14 to 17. The mirror 3 is arranged in order to reflect a part 14 to 16 of these light rays. The mirror 3 is arranged in order to reflect some of these rays 14 towards the floor 8a, rays projected sufficiently close to the axis of projection 11 by the projector 2 even being reflected by the mirror onto the projector 2. The mirror 3 is also arranged in order to reflect some of these rays 15 towards the walls 7, and some of these rays 16 towards the ceiling 8b. The mirror 3 is moreover arranged in order not to reflect a peripheral part of the mother image, the light rays 17 originating from this part of the mother image being directly projected onto the three-dimensional environment 7, 8a, 8b by the projector 2.

The mirror 3 has a revolution symmetry around an axis of revolution 12. The mirror 3 can for example comprise a portion of a sphere the convex surface of which is oriented towards the projector 2. In order to simplify the geometry of the device 1, the axis of revolution 12 of the mirror 3 is substantially merged with the axis of rotation 6 of the camera 4, the axis of projection 11, and the optical axis 13.

Using the convex mirror 3, and unlike a projection device according to the state of the art, the device 1 is arranged in order to project the mother image panoramically around the axis of projection 11. The mirror can for example project a given mother image within an angle larger than 180 degrees around the axis of projection 11. For example, a mother image centred on the axis of revolution 12 and therefore the axis of projection 11 is reflected then projected by the mirror over 360 degrees around the axis of projection 11, i.e. all around the axis of projection. On the other hand, for a mother image which, when it is displayed on the matrix 9, occupies only a part of the matrix without cutting or surrounding the axis of revolution 12 and therefore the axis of projection 11, this mother image is reflected then projected by the mirror 3 within an angle which can have any value whatever less than 360 degrees around the axis of projection. According to the mother image, this mother image can therefore be projected onto a single one or onto all of the side walls.

The mirror 3 is positioned with respect to the projector 2 so that the first solid angle of projection 18 encompasses the convex surface of the mirror 3. The mirror 3 is arranged in order to project the mother image within a second solid angle, the size of the mother image increasing progressively as it is propagated from the mirror towards the environment following the second solid angle. In the particular case where the axis of revolution 12 and the axis of projection 11 are substantially merged, the second solid angle is itself also centred on the axis of projection 11. The second solid angle can have any value whatever between 0 and $4\pi$ steradians, the value of the second solid angle depending in particular on the position of the mother image with respect to the axis of revolution of the mirror or the axis of projection and the size of the mother image on the matrix 9. For a mother image centred on the axis of revolution of the mirror, and therefore on the matrix 9, this second solid angle is typically larger than $2\pi$ steradians. As shown in FIG. 1, the second solid angle can even be slightly smaller than $4\pi$ steradians, the mirror being arranged in order to reflect then project the mother image from the floor 8a to the ceiling 8b. The mother image can therefore be projected onto all the side walls, the floor and the ceiling of the room. In FIG. 1, the second solid angle is delimited by the parts of the light rays 16 situated between the mirror 3 and the ceiling 8b.

The camera 4 and the means of rotating 5 the camera about its axis of rotation 6 allow images of the three-dimensional environment 7, 8a, 8b to be acquired. The camera can be a CCD camera connected to an acquisition card, or a webcam with a USB connection, or even a simple digital photo device with a USB or wireless (Bluetooth or WIFI) connection. The camera can be rotated by a stepping type motor, the transmission between the motor and a movement of the camera about its axis 6 is provided by any means of transmission, for example a synchronization belt, and the camera is guided in rotation by a mechanical assembly, for example a large-diameter bearing surrounding the axis of projection 11, and allowing the light rays of the mother image projected by the projector to pass. For a position of the camera around its axis, the camera directly receives light rays 20 emitted by the environment and not reflected by the mirror. From these light rays 20, the camera thus acquires an image of a part of the three-dimensional environment, i.e. of a part of the walls 7, the floor 8a, the ceiling 8b, and of certain objects contained in the room.

The camera 4 and the means of rotation 5 form omnidirectional acquisition means of the three-dimensional environment, these acquisition means being able of acquiring images of parts of the three-dimensional environment distributed over more than 180 degrees around the axis of projection 11. For example, a rotation of the camera 4 of 360 degrees about its axis of rotation 6 makes it possible to acquire images of the three-dimensional environment all around the axis of rotation 6, and therefore all around the axis of projection 11. However, there can be blind spots, i.e. parts of the three-dimensional environment which cannot be viewed by the camera, for example parts of the floor 8a hidden by the projector 2, or parts of the ceiling 8b hidden by the mirror 3. In order to limit these blind spots the camera has a relatively wide field of view 19, typically of the order of 90 degrees and therefore a very short focal length. Similarly, in order to limit these blind spots, the camera is placed between the projector 2 and the mirror 3, so that the optical axis of the camera is substantially perpendicular to the axis of projection 11, or is slightly inclined with respect to the perpendicular to the axis of projection. Finally, still in order to limit these blind spots, the rotation means 5 can be arranged in order to carry out a series of successive rotations of the camera 4 over 360 degrees about the axis of rotation 6, and for each of these successive rotations to modify the inclination of the camera with respect to the perpendicular to the axis of projection 11 or axis of rotation.

The camera is therefore arranged in order to perceive the three-dimensional environment. The device 1 comprises moreover calculation means 21 connected to the camera 4. These calculation means typically comprise means for implementing algorithms or software, such as for example a processor, a central processing unit of a computer, or an electronic card. These calculation means are arranged in order to take account of a perception of the three-dimensional environment by the camera 4, then to perform on the mother image different types of correction according to the perception of the three-dimensional environment.

Firstly, the calculation means are arranged in order to model the three-dimensional environment based on one or more images of the environment acquired by the camera. The larger the number of images used for the modelling, or the more these images are distributed around the axis of rotation 6, the larger is the part of the three-dimensional environment able of being modelled. The calculation means are arranged in order to construct a three-dimensional modelling of the environment by triangulation between the mirror 3 and the acquisition means 4, 5. The calculation means are moreover arranged in order to calculate from the modelling a distortion to be applied to the mother image according to a position of an observer 22, so that from his position, the observer observing the projection of the mother image on the three-dimensional environment observes a scene from a given virtual viewpoint. The calculation means therefore make it possible to construct the mother image in order to give the observer the illusion of a virtual viewpoint.

On the other hand, the camera comprises means for measuring at least one radiometric characteristic of the three-dimensional environment, such as colorimetric characteristics or the functions of reflectance of the three-dimensional environment. The calculation means are moreover arranged in order to correct the mother image according to the measured radiometric characteristics, so that the observer 22 observes the projection of the mother image onto the environment with the desired colorimetric rendering and light intensities. Thus, the calculation means allow the mother image of the colorimetric viewpoint and the light intensity to be faithfully reconstructed, taking account in particular of the colour, the texture, and the reflectance of each element of the three-dimensional environment onto which the mother image is projected, and also taking account of the light sources present in the three-dimensional environment.

A method implemented by the device 1 comprises the following steps:
 a projection of the mother image, by the projector 2, along the optical axis of projection 11,
 a reflection of the mother image by the mirror 3, and
 a projection onto the three-dimensional environment of the mother image reflected by the mirror 3.

As indicated previously, the mirror projects the mother image preferably panoramically, for example within an angle A larger than 180 degrees around the axis of projection, or even over 360 degrees around the axis of projection 11, i.e. on all the walls 7 of the room. In practice, this angle A can have any value whatever comprised between zero and 360 degrees, this value depending on the size of the mother image at the level of the matrix 9, and the position of the mother image on the matrix 9.

FIG. 3 shows an example of a mother image 23 as it is displayed on the matrix 9 of the projector 2. The mother image 23 is centred on the matrix 9, and is therefore cut substantially in the middle by the axis of projection 11. A part 24 situated at the periphery of the mother image 23, outside a closed line 25 (shown by a dotted line), is not reflected by the mirror 3 after having been projected by the projector 2, but is directly projected onto the three-dimensional environment by the projector 2. The light rays 17 originating from the pixels of this part 24 do not encounter the mirror 3 and are directly projected onto the ceiling 8b. This part 24 of the image can be used or extinguished; in practice the tendency is for the part 24 of the matrix which has direct incidence on the environment to be extinguished and to restrict the illumination to the mirror alone. The other part 26 of the mother image 23, situated within the line 25, is projected by the projector 2 then reflected by the mirror 3 onto the three-dimensional environment. The shape of the line 25 depends on the shape of the mirror 3. In the case where the convex mirror has a revolution shape, such as a portion of a sphere, the closed line 25 is a circle. The mother image 23 is projected onto the three-dimensional environment by the projector 2 within the second solid angle larger than $2\pi$ steradians, or even substantially equal to or slightly smaller than $4\pi$ steradians.

The method comprises moreover a construction of the mother image 23 according to an observer position 22, so that from his position, the observer 22 observing the projection of the mother image on the environment observes a scene from a virtual viewpoint P.

This construction is carried out as follows.

The scene is stored in the projector 2 by storage means, in the form of six perspectives 27 to 32 shown in FIG. 4. All these perspectives are views of the scene from the viewpoint P, these perspectives being views of the scene in the six directions along the three axes of an orthogonal three-dimensional reference point. These six perspectives are each contained in a square, so that, by placing these six perspectives on the six inner faces of a cube 33 shown in FIG. 5, the observer positioned at the centre of this cube observes the scene from the viewpoint P. These perspectives can be photographs of an actual landscape, or can be synthesized images.

The six perspectives are then processed by an algorithm implemented by the calculation means 21, so as to participate in the construction of the mother image 23 projected by the projector 2. To this end, the calculation means use a modelling of the three-dimensional environment, comprising a determination of the coordinates, within the frame of reference associated with the projector 2, of points of the environment on which the mother image is projected. This modelling allows, for each point or pixel of the mother image 23, a creation of a correlation table between the coordinates (u, v) of the pixel in the mother image 23, the coordinates of the point $M_r$ of the three-dimensional environment onto which this pixel is projected, and the direction of the straight line D connecting the point $M_r$ and the observer position 22, then associating with this pixel the colour and the luminosity of a point $M_v$, this point $M_v$ being a point of one of the six perspectives 27 to 32 and being positioned at the intersection of the cube 33 and the straight line D, the cube 33 being positioned in the environment 7, 8a, 8b so that its centre, i.e. the viewpoint P, is substantially merged with the observer position 22.

The position of the observer can be defined by default as being the position of the projector 2, or can be any position and defined by a user by input means or determined by means of locating the observer.

In an embodiment, the coordinates of the points of the environment on which the points of the mother image are projected are defined by a user, for example using input means allowing the user to define the dimensions of the room in which the device 1 is located, and making it possible to define the position of the projector 2 and the mirror 3 in this room.

In a further embodiment, the geometry of the environment is known by an external information source, comprising optical sensors such as laser or ultrasound.

Finally, in a last embodiment of the method according to the invention, the modelling of the environment comprises:
    a projection, by the projector, of a modelling mother image comprising at least one modelling point;
    a reflection of the modelling mother image by the mirror 3;
    a projection onto the three-dimensional environment of the modelling mother image reflected by the mirror 3; and
    an acquisition of at least one image of the environment acquired for the modelling, these images of the environment being preferably acquired for different angular positions of the camera 4 around the axis of rotation 6; and
    for each modelling point and for each image of the environment acquired for the modelling:
        associating the modelling point with a point of the image of the environment acquired for the modelling, this point of the image of the environment imaging a first point of the environment 34 onto which the modelling point is projected,
        calculating the path of a light ray 15 originating from the modelling point, reflected by the mirror, and projected onto the first point of the environment,
        calculating the path of a light ray 20 originating from the first point of the environment 34 and imaged by the point of the image of the environment acquired for the modelling, and
        calculating an intersection of the path of the light ray 15 originating from the modelling point and the path of the light ray 20 originating from the first point of the environment 34, the coordinates of the intersection point between these two paths being substantially the coordinates of the first point of the environment.

Thus the coordinates of several first points of the environment are obtained using several modelling points.

The calculated paths are simple, as they are constituted by straight lines or portions of straight lines in the case of geometrical optics. The path calculations depend on calculation parameters, which will be described in greater detail below.

In practice, due to possible shortcomings in the knowledge of these calculation parameters, the calculated path of the light ray 15 originating from the modelling point and the calculated path of the light ray 20 originating from the first point of the environment do not intersect, but are very close at one location. By approximation, the coordinates of the middle of the shortest segment connecting these two paths are considered to be the coordinates of the intersection point between these two paths.

The modelling thus makes it possible, for each modelling point of coordinates (u, v) on the mother image 23, and therefore by extension for each pixel of coordinates (u, v) on the mother image 23, to create the look-up table between the coordinates (u, v) of this modelling point or pixel, the coordinates of the first point of the environment 34 (or $M_r$) onto which this modelling point or pixel is projected, and the direction of the straight line D connecting this modelling point 34 and the observer position 22. All these coordinates and directions are preferably expressed within the frame of reference of the projector 2.

The association can for example be carried out by not projecting the mother image, with the camera observing an image of a neutral environment, then projecting a mother image comprising a single modelling point, the camera observing another image of the environment corresponding to the neutral image to which is added the signal of the modelling point reflected by the mirror, projected onto the environment, and re-emitted towards the camera. In a variant, the association can for example be carried out by projecting a mother image comprising several modelling points distributed according to a particular distribution, so that an image of the environment acquired for the modelling comprises several points reproducing this distribution substantially and at least in part, each of these points of the image of the environment then easily being associated with one of the modelling points.

The greater the density of modelling points on the mother image, the better the resolution of the modelling of the three-dimensional environment. If each mother image comprises only a single modelling point for the modelling, the modelling comprises successive projections of mother images each having a different modelling point, the resolution of the modelling increasing with the number of successive projected mother images.

Preferably, the images of the environment acquired for the modelling are implemented for different neighbouring angular positions of the camera. In fact, a single image of the environment does not necessarily image all the points of the environment on which all the modelling points are projected. These neighbouring angular positions are preferably distributed over 360 degrees around the axis of rotation, so that two images acquired for two neighbouring angular positions image a common part of the three-dimensional environment. Thus, the modelling makes it possible to model over 360 degrees around the axis of rotation 6, and therefore makes it possible to model the whole of the three-dimensional environment, or almost the whole of the environment if there are blind spots.

Thus, the three-dimensional coordinates of the points of the environment on which the mother image is projected can be obtained within the frame of reference linked to the projector 2, proceeding by triangulation between the mirror 3 on the one hand, and the camera 4 on the other. In fact, a knowledge of the parameters of the device 1 makes it possible to calculate the equations of the paths of the rays originating from the mirror 3 and the equations of the paths of the rays captured by the camera, and the calculation of their intersections. The three-dimensional environment can therefore be fully modelled, either by a scattergram-type non-structured modelling approach, or by a gridding-type approach. The latter case assumes that the modelling points are projected in an ordered manner in order to know how to connect the points of the environment 34 obtained. It is also possible to analyze a scattergram of the environment in order to recognize flat portions or other geometrical shapes.

As mentioned previously, the path calculations are simple geometrical optics calculations which depend on calculation parameters. These calculations are preferably carried out within the frame of reference of the projector 2.

For example, calculation of the path of a light ray 15 originating from a modelling point, reflected by the mirror, and projected onto the first point of the environment 34, depends in particular on the following parameters:

the position of the modelling point on the matrix 9, this point preferably comprising a single pixel, or can comprise a group of assembled pixels, the dimension of the matrix 9 and the resolution in pixels of the matrix 9, the relative position of the matrix 9 with respect to the lens 10; in particular, the axis of projection 11 and the optical axis 13 of the lens 10 pass substantially through the middle of the matrix 9, but there can possibly be a slight offset or inclination between this centre and these axes 11, 13; this offset and this inclination must be known or estimated, the focal length of the lens 10, the optical distortions or aberrations of the lens 10, the geometry and the dimensions of the mirror 3, the relative position of the projector 2 with respect to the mirror 3, in particular the distance and the alignment between the projector 2 and the mirror 3; in fact, the axis of projection 11 and the axis of revolution 12 are substantially merged, but it is possible for there to be an offset and/or inclination between these two axes 11, 12; this offset and this inclination must be known or estimated.

Similarly, the calculation of the path of a light ray 20 originating from the first point of the environment 34 depends in particular on the following parameters:

the focal length of the camera 4, for the camera sensor, the dimensions and the resolution of the sensor on which the three-dimensional environment is imaged, the optical distortions or aberrations of the camera 4, the relative position of the camera with respect to the projector 2 during the acquisition of the first image; the angular position of the camera 4 must be known, the rotational pitch of the camera about its axis 6 can be for example deduced from the pitch of the motor serving to rotate the camera; furthermore, the axis of projection 11 and the axis of rotation 6 are substantially merged, but it is possible for there to be a slight offset and/or inclination between these two axes 11, 6; this offset and this inclination must be known or estimated.

In order to be able to carry out the modelling step described previously, all these parameters must be known. Certain parameters can be stored in memory by storage means. For example, the focal lengths, dimensions and the resolutions of the camera and the matrix 9 can be supplied by a manufacturer. The distortions or aberrations of the camera or the lens 10 can for example be known by means of test cards.

However, it can be necessary to measure the relative positions of the mirror 3, the camera 4, and the rotational movement of the camera with respect to the projector 2. In fact, a user can carry out approximate alignments of the axes of rotation 6, of projection 11, of revolution 12.

However, the precision of these alignments is generally insufficient to know the transformations between the frames of reference linked to the projector, the mirror and the camera, and is therefore insufficient to carry out the path calculations correctly.

The method according to the invention therefore preferably comprises an optimization or calibration of the calculation parameters.

The general principle of the calibration consists of projecting calibration points onto the three-dimensional environment, having known positions in the mother image, and deducing therefrom certain parameters based on the coordinates of the projections of the calibration points in an image acquired by the camera for a known angular position. The calibration points can be distributed on the mother image in the form of a scattergram or in the form of lines. The calibration does not at any time call on the three-dimensional coordinates of the points of the environment on which the calibration points are projected, which makes it independent of the geometry of the three-dimensional environment. Nor is it necessary to detect characteristic points of the environment as is done by conventional stereovision calibration methods, but the projector 2 is used to create them.

This has the advantage of being able to project calibration points having sufficient contrast, for example light calibration points on a dark background, so that they can be detected by the camera whatever the nature of the materials of the environment. An image subtraction procedure makes it possible to increase the contrast of the device 1 very significantly, by dispensing with differences of materials and ambient light of the environment. The image subtraction procedure typically comprises a subtraction, from an image acquired by the camera during the projection of a mother image comprising calibration points, of an image acquired by the camera during the projection of a mother image not comprising calibration points. To this end, the camera preferably comprises automatic gain control means, in order to remain within the linear range of the sensor of the camera, avoiding the saturations which adversely affect the subtraction.

The calibration then comprises a projection of a mother image comprising at least one calibration point, and acquisition of at least one image of the environment acquired for the calibration.

The images of the environment acquired for the calibration can comprise at least one pair of images which are different but which image a common part of the environment, a first type of calibration comprising for each calibration point and for each pair of images:
  associating the calibration point with a point of the first image of the pair and with a point of the second image of the pair, the point of the first image of the pair and the point of the second image of the pair imaging a second point of the environment onto which the calibration point is projected,
  calculating a theoretical position of the point of the second image of the pair, from the position of the point of the first image of the pair and from the calculation parameters,
  calculating a distance between the position of the point of the second image of the pair and the theoretical position of this point of the second image of the pair.

This sequence of steps is followed by a modification of at least one of the calculation parameters, and a new calculation of the theoretical positions, so as to minimize the sum, over all the calibration points, of the distances between the position of the point of the second image of the pair and the theoretical position of this point of the second image of the pair.

Thus, from acquisitions of images for different angular positions of the camera, these images image points of the environment regularly distributed in the three-dimensional environment, and by exploiting a redundancy of the points of the environment between two consecutive images, the calculation parameters can be optimized by minimizing the quadratic distance between the points of an image acquired by the camera and the theoretical position of the points of a successive image after rotation.

This first type of calibration makes it possible in particular to optimize the distortion parameters of the camera, and the rigid transformation parameters of the frame of reference of the camera 4 with respect to the frame of reference of the axis of rotation 6, such as the angle between the optical axis of the camera 4 and the axis of rotation 6.

A second type of calibration can comprise, for each calibration point and for each image of the environment acquired for the calibration:
  calculating the path of a light ray originating from the calibration point, reflected by the mirror, and projected onto a third point of the environment,
  calculating the path of a light ray originating from the third point of the environment and imaged by a point of the image of the environment acquired for the calibration,
  calculating a distance between the path of the light ray projected onto the third point of the environment and the path of the light ray originating from the third point of the environment.

This sequence of steps is followed by a modification of at least one of the calculation parameters, and new calculations of the paths of the rays originating from the calibration points and the paths of the rays imaged by points of the at least one image of the environment acquired for the calibration, so as to minimize the sum, over all the calibration points, of the distances between the path of the light ray projected onto the third point of the environment and the path of the light ray originating from the third point of the environment.

In other words, over all the calibration points, the number of intersections is maximized between the path of the light ray projected onto the third point of the environment and the path of the light ray originating from the third point of the environment.

This second type of calibration makes it possible to optimize in particular values for:
  rigid transformation parameters between the frame of reference of the mirror 3 and the frame of reference of the projector 2, such as for example the distance between the mirror and the projector, and an offset or an inclination between the axis of revolution 12 of the mirror and the axis of projection 11;
  rigid transformation parameters between the frame of reference of the axis of rotation 6 of the camera 4, and the frame of reference of the projector 2, such as for example the distance between the camera 4 and the axis of projection 11, the inclination between the optical axis of the camera 4 and the axis of projection 11, and an offset or an inclination between the axis of rotation 6 and the axis of projection 11.

For the first and the second type of calibration, the greater the number of calibration points on the mother image, the better the optimization of the parameters.

Finally, the method according to the invention can comprise a measurement of at least one radiometric characteristic of the three-dimensional environment, and a correction of the mother image according to at least one measured radiometric characteristic. The correction can comprise a colorimetric or intensity correction of the mother image. Thus, the combination of the projector and the camera allows a comparison of the colour and intensity reflected by the three-dimensional environment with an expected colour and intensity of the projection of the mother image on the three-dimensional environment. This makes it possible to comprehend the restablishment of the colours by the environment, and to ensure the projection of the mother image onto the environment is accurate with respect to the scene that served as the basis for construction of the mother image.

Of course, the invention is not limited to the examples which have just been described and numerous adjustments can be made to these examples without exceeding the scope of the invention.

In particular, it is possible for the axes of rotation 6, projection 11, revolution 12 and the optical axis 13 not to be substantially merged. The calculations of the paths of the light rays emitted by the projector and the paths of the light rays emitted by the points of the environment are then more complex, as they must take account of significant offsets and/or inclinations between these axes, consequently the modelling of the three-dimensional environment and the construction of the mother image are thus themselves more complex.

Moreover, the convex surface of the mirror 3 does not necessarily have the shape of a portion of a sphere, as this shape of a portion of a sphere makes the vertical resolution of the device 1 inhomogeneous. In fact, in the device 1 which has just been described, the more distant a pixel is from the centre of the matrix 9, the greater is the portion of the mirror reflecting the light rays 14 to 16 emitted by this pixel, and the larger the size of the point of the environment onto which this ray is projected. Preferably therefore, a profile of the mirror 3 is used which tends to homogenize the vertical resolution of the device 1 with respect to a spherical mirror.

The invention claimed is:

1. Method of projection implemented by a projection device according comprising i) a projector (2) arranged in order to project a mother image (23) along an axis of projection (11), and ii) a convex mirror (3) arranged in order to reflect the mother image at least in part and to project it onto a three-dimensional environment (7, 8a, 8b), comprising:

a projection of the mother image (23) along an axis of projection (11), and a reflection of at least one part of the mother image by the convex mirror (3), a projection onto the three-dimensional environment (7, 8a, 8b) of the mother image reflected by the convex mirror, acquiring at least one image of the three-dimensional environment, modelling of the three-dimensional environment, the mother image comprising at least one modelling point, the image acquisition comprising acquiring at least one image of the environment acquired for the modelling, the modelling comprising for each modelling point and for each image of the environment acquired for the modelling:

calculating the path of a light ray (15) originating from the modelling point, reflected by the mirror, and projected onto a first point of the environment, calculating the path of a light ray (20) originating from the first point of the environment (34) and imaged by a point of the image of the environment acquired for the modelling, and calculating an intersection of the path of the light ray (15) originating from the modelling point and the path of the light ray (20) originating from the first point of the environment (34).

2. Method according to claim 1, characterized in that the mirror reflects the mother image by deforming the mother image.

3. Method according to claim 1, characterized in that the mirror projects the mother image within a solid angle larger than $2\pi$ steradians.

4. Method according to claim 1, characterized in that the mirror projects the mother image within an angle larger than 180 degrees around the axis of projection (11).

5. Method according to claim 1, characterized in that the acquisition of an image comprises:

positioning a camera (4) at an angular position about an axis of rotation (6), and acquiring an image of the environment for this angular position of the camera, from light rays (20) emitted by the three-dimensional environment.

6. Method according to claim 1, characterized in that the path calculations depend on calculation parameters, in that it comprises a calibration of the parameters, in that the mother image comprises at least one calibration point, and in that the image acquisition comprises acquiring at least one image of the environment acquired for the calibration.

7. Method according to claim 1, characterized in that it comprises moreover a construction of the mother image according to a position of an observer (22), so that from his position, the observer observing the projection of the mother image onto the environment observes a scene from a virtual viewpoint (P).

8. Method according to claim 1, characterized in that it comprises moreover a measurement of at least one radiometric characteristic of the three-dimensional environment, and in that it comprises a correction of the mother image according to at least one measured radiometric characteristic.

9. Method according to claim 1, characterized in that the mirror projects the mother image within a solid angle larger than $2\pi$ steradians and smaller than $4\pi$ steradians.

10. Method according to claim 1, characterized in that the mirror projects the mother image within an angle equal to 360 degrees around the axis of projection.

11. Method according to claim 2, characterized in that the mother image is projected along the axis of projection within a first solid angle, and in that the mirror projects the mother image within a second solid angle larger than the first solid angle.

12. Method according to claim 6, characterized in that the images of the environment acquired for the calibration comprise at least one pair of images which are different but which image a common part of the environment, the calibration comprising for each calibration point and for each pair of images:

associating the calibration point with a point of the first image of the pair and with a point of the second image of the pair, the point of the first image of the pair and the point of the second image of the pair imaging a second point of the environment onto which the calibration point is projected, calculating a theoretical position of the point of the second image of the pair, from the position of the point of the first image of the pair, and the calculation parameters.

13. Method according to claim 6, characterized in that the calibration comprises for each calibration point and for each image of the environment acquired for the calibration:

calculating the path of a light ray originating from the calibration point, reflected by the mirror, and projected onto a third point of the environment, calculating the path of a light ray originating from the third point of the environment and imaged by a point of the image of the environment acquired for the calibration.

14. Method according to claim 12, characterized in that the calibration comprises moreover a modification of at least one of the calculation parameters, so as to minimize the sum, over all the calibration points, of the distances between the position of the point of the second image of the pair and the theoretical position of this point of the second image of the pair.

15. Method according to claim 13, characterized in that the calibration comprises moreover a modification of at least one of the calculation parameters, so as to minimize the sum, over all the calibration points, of the distances between the path of the light ray projected onto the third point of the environment and the path of the light ray originating from the third point of the environment.

* * * * *